Dec. 18, 1962 R. G. HARMON 3,068,686
VAPOR FRACTION ANALYSIS
Filed Oct. 22, 1958 4 Sheets-Sheet 1

INVENTOR
RAYMOND G. HARMON
BY
ATTORNEY

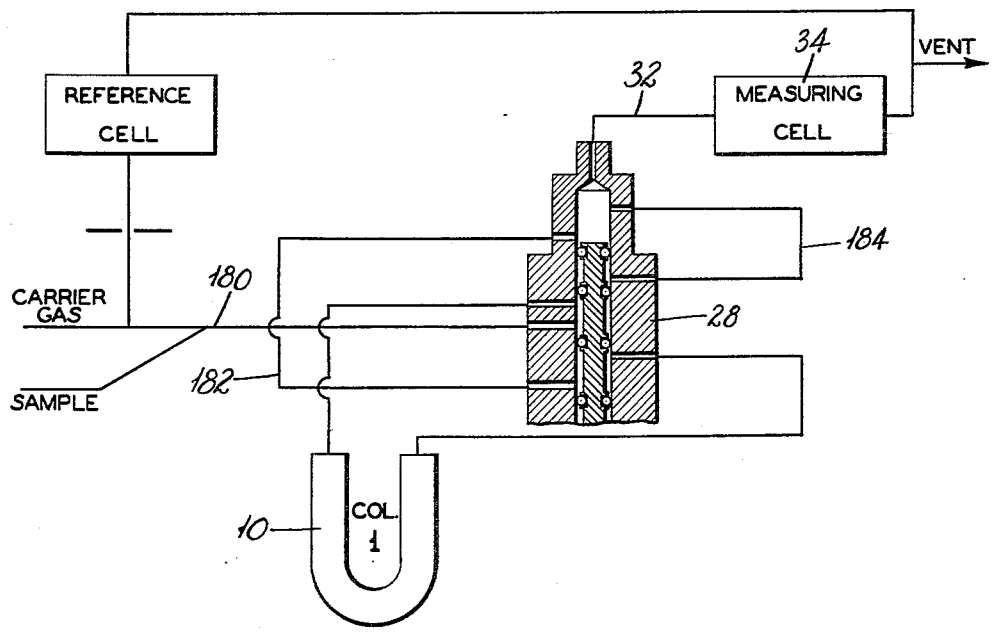
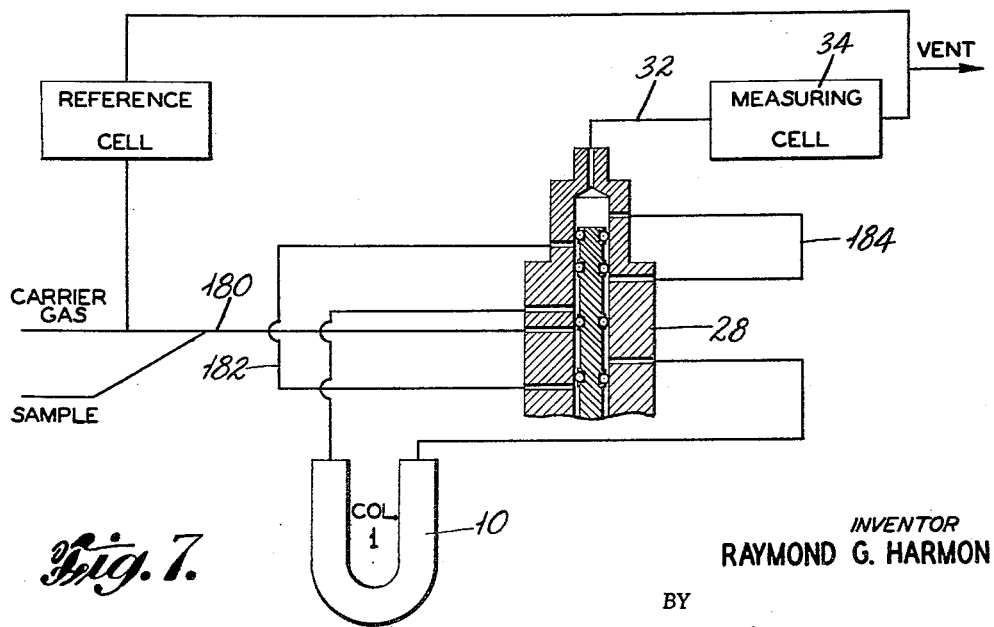

Dec. 18, 1962 R. G. HARMON 3,068,686
VAPOR FRACTION ANALYSIS
Filed Oct. 22, 1958 4 Sheets-Sheet 4

INVENTOR
RAYMOND G. HARMON
BY
*[signature]*
ATTORNEY

United States Patent Office 3,068,686
Patented Dec. 18, 1962

3,068,686
VAPOR FRACTION ANALYSIS
Raymond G. Harmon, Charleston, W. Va., assignor to Union Carbide Corporation, a corporation of New York
Filed Oct. 22, 1958, Ser. No. 768,910
10 Claims. (Cl. 73—23)

The present invention relates to method and apparatus for vapor fraction analysis and, more particularly, to such method and apparatus capable of continually measuring each desired component in a multi-component fluid sample stream without thermal upsets of the measuring circuit.

In the chromatographic analysis of a multi-component sample it has often been noted that, although adequate resolution of components is obtained, some of the components are so strongly adsorbed that their retention times in the column are excessively long. Under many circumstances this condition may be adequately compensated for by the use of multi-column apparatus. Where such apparatus is impracticable or undesirable, however, the problem of excessive time lags may be quite burdensome.

Besides failure to properly measure desired components because of excessive time lags, thermal upsets of the measuring cell have also occurred. For example, in multi-column apparatus, when a column is bypassed, the total flow resistance of the fluid circuit is substantially lowered. This creates a surge of fluid through the measuring cell and simultaneously raises the static pressure therein, resulting in thermal unbalance.

Similarly, many of the complex mixtures analyzed by chromatographic methods contain relatively large components which need not be measured. Such components cause large upscale readings accompanied by measuring circuit unbalance.

Accordingly, it is the prime object of the present invention to provide method and apparatus capable of continually measuring for the percentage of each desired component of a multi-component fluid sample wherein the retention time of the components in the apparatus is not excessively long, good resolution is obtained between desired components of the multi-component sample, and thermal upsets of the measuring cell are substantially avoided.

Other aims and advantages will be apparent from the following description and appended claims.

Apparatus suitable for practicing the method of the invention are shown in the embodiments of the drawings wherein:

FIGS. 6 and 7 are schematic views of a modified column selector assembly for back flushing a fractionating column;

Figure 1:
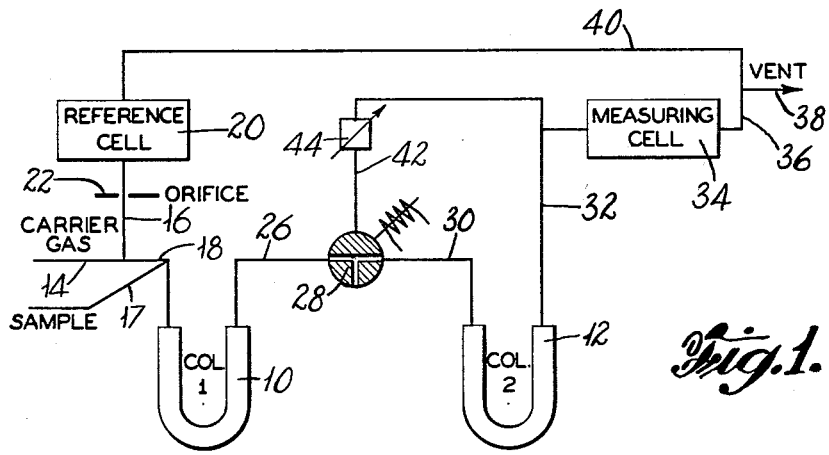
FIG. 1 is a schematic view of chromatographic apparatus having a column selector positioned to pass an incoming sample vapor successively through a weakly adsorbing column and a strongly adsorbing column so that the less retentious components can be passed into the more strongly adsorbing column.

In the operation of the embodiment shown in FIG. 1, carrier gas and multi-component sample vapor are concurrently introduced to column 10 through conduit 18 and conduit 17 where the less retentious components first separate from the more highly retentious components. The less retentious components, together with the carrier gas, are passed through conduit 26, and column selector 28 to strongly adsorbing column 12 where they are either stored or eluted. The carrier gas then passes from column 12 through the measuring cell to the vent. During this period, a stream of carrier gas is also passed through the reference cell and conduit 40 to the vent.

Figure 2:
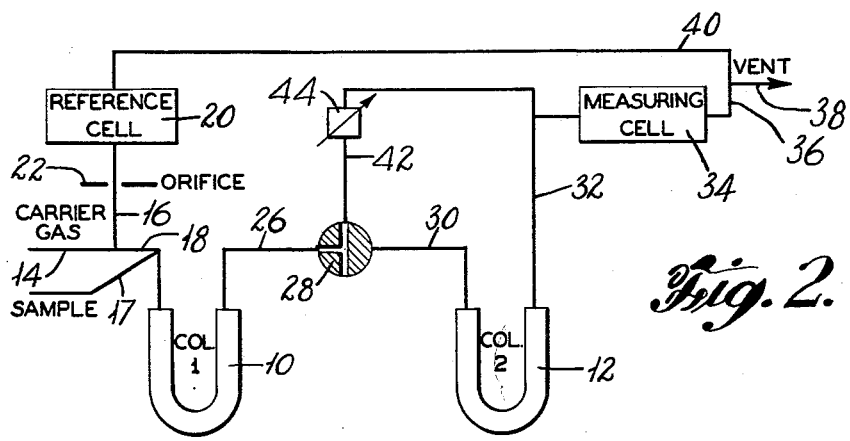
FIG. 2 is a schematic view of the same apparatus wherein the column selector is positioned to bypass the strongly adsorbing column and elute the more retentious component gases as binary components which are passed from the weakly adsorbing column to a measuring cell through a flow restrictor.

At that predetermined time when it is known that, for a specific sample gas, there are no less retentious components remaining in column 10, and it is known that all of these weakly retained components are either stored in column 12 or have been eluted and measured, the column selector 28 is actuated by an electric timer or pneumatic means (not shown) to the position shown in FIG. 2. At this time all of the sample has entered column 10 and all of the less retentious components are in column 12. The carrier gas continues to flow, thereby stripping the more retentious, now adequately resolved, components from column 10 through lines 26 and 42 and the adjustable restrictor 44 to the measuring cell where measurement is effected. During this time, there is no flow through column 12.

When column selector 28 is switched from the position shown in FIG. 1 to that shown in FIG. 2 the resistance to flow offered by column 12 is suddenly removed. Without adequate compensation, this sudden change would cause, first, an instantaneous surge in flow through column 10 and, second, a permanent lowering of the static pressure within column 10. In order to prevent inaccuracies in measurement resulting from these conditions, adjustable restrictor 44 has been provided. The total resistance of line 42 and restriction 44 may thus be adjusted to match the resistance of column 12. When the adjustment is properly made, flow characteristics remain unchanged during the switching sequence.

At the end of a predetermined period of time, when all of the more retentious components have been eluted from column 10 and passed through the measuring cell, the electric timer returns the column selector 28 to the position shown in FIG. 1. At this time, the carrier gas is again admitted to column 12 and the less retentious components stored in the column are stripped (eluted) from the column and passed through the measuring cell where measurement is made for each component.

A multi-point, linear-type column selector of the type illustrated in FIGS. 3 through 9 is a preferred type of apparatus in the practice of the method of the invention. In its preferred embodiment, the body of the column selector, together with a standard commercial-type adjustable flow restrictor is provided as a single unit for system installation with any desired components.

Figure 3:
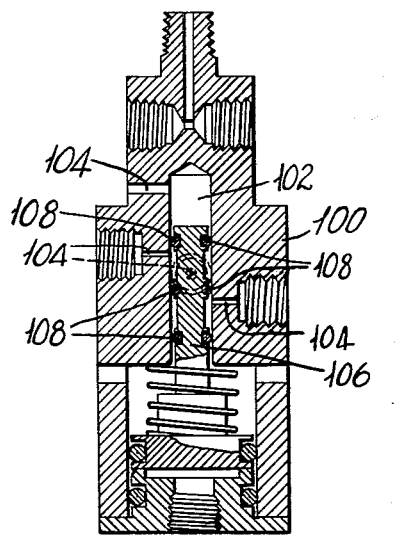
FIG. 3 is a sectional elevational view of a column selector adaptable to use in the apparatus of the invention.

Basically, and with particular reference to FIG. 3, the column selector consists of a block of massive metal 100 having a bore 102 concentric with its longer axis. A multiplicity of small openings 104 are drilled into the block to radially connect with axial bore 102. Into bore 102 is inserted slidable member 106 formed to provide gas tight projections 108 at desired locations along the member and between member 106 and bore 102. Between projections 108, member 106 is inletted to provide fluid flow space between the member and bore 102.

Movable member 106 may be formed from one piece of metal while projections 108 are elastic O-rings inserted in properly placed grooves. Another method of manufacture may be employed wherein a series of metal cylinders, each end of which has a 30° to 45° chamfer, are axially aligned on a shaft. Normally non-elastic O-rings are inserted into the grooves formed by abutting chamfers. The several cylinders are held in place by an adjustable spring-loaded fastener. When assembled, movable member 106 is inserted into bore 102, the O-rings surfaces 108 fitting loosely against the sides of bore 102. The spring loaded fastener is then tightened, causing the chamfered surfaces to draw together and forcing each projecting O-ring to assume a gas tight fit against the bore surface.

An improved type column selector is illustrated in the embodiments of FIGS. 4 through 9 wherein the porting of the upper section of the selector bore has been modified.

Figure 4:
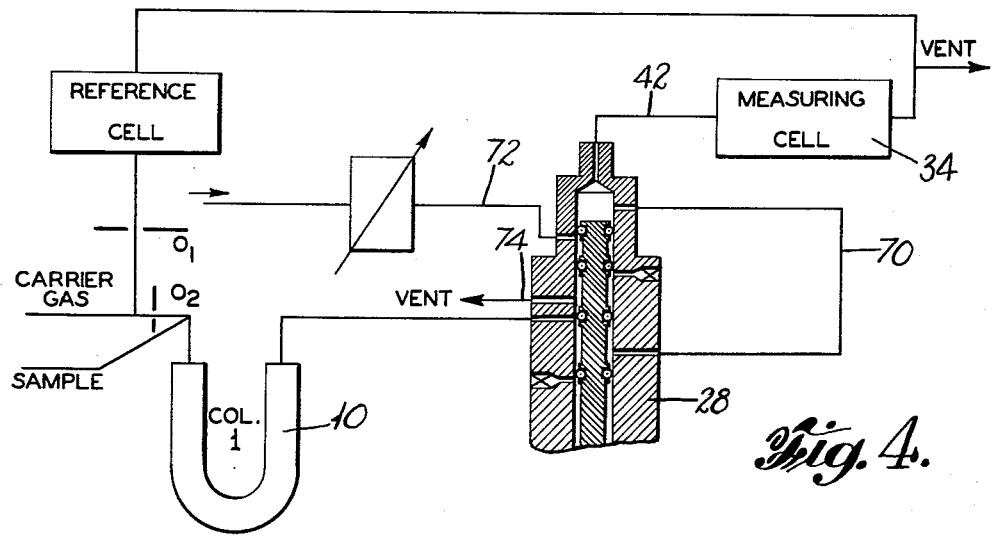
FIGS. 4 and 5 are schematic views of a modified column selector for diverting large peaks from the measuring cell.
Figure 5:
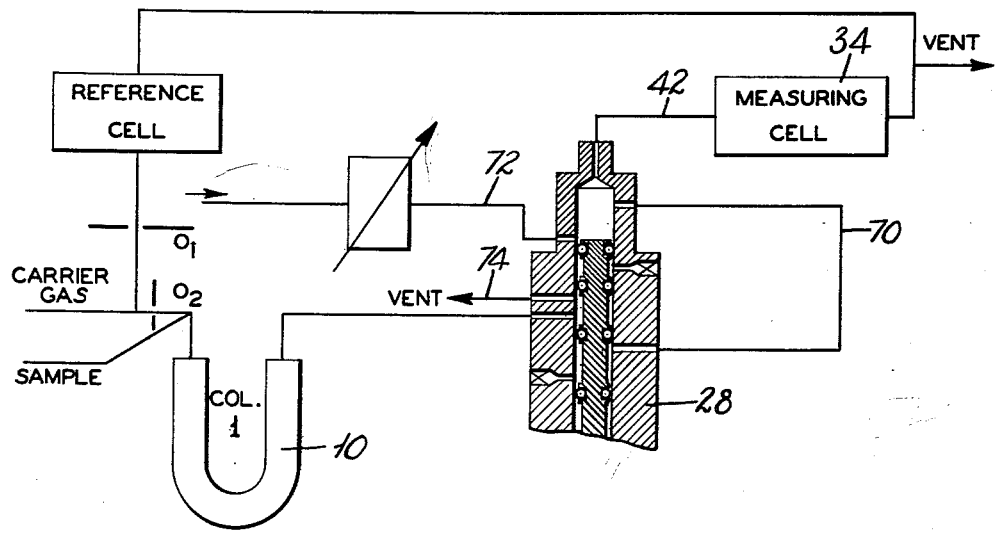

FIGS. 4 and 5 illustrate an assembly for diverting large component peaks from the measuring cell. In FIG. 4 the binary mixture from column 10 enters selector 28, flows through conduit means 70 and 42 to measuring cell 34. Carrier gas entering through conduit means 72 is dead-ended.

At the proper time, selector 28 is actuated to assume the position shown in FIG. 5. The binary mixture then flows directly from column 10 to column vent conduit 74. Simultaneously, carrier gas enters selector 28 from conduit 72 and flows to conduit 42 and through measuring cell 34. Thus large component peaks which might cause serious upsets to the detector element of cell 34 may be diverted. Thermal upsets to cell 34 are minimized by maintenance of carrier gas flow therethrough.

FIGS. 6 and 7 illustrate an assembly used for back flushing a column. This technique is used to decrease the time necessary to elute components which are adsorbed or absorbed in the first part of the column. In FIG. 6, the sample and carrier gas conduit 180 enters column selector 28 and flows through column 10 and conduits 182 and 32 to measuring cell 34. Whenever the components that are eluted quickly have passed through the measuring cell, the selector is actuated to assume the position shown in FIG. 7.

In FIG. 7 the carrier gas from conduit 180 passes through selector 28 and enters the end of column 10 that was the downstream end in FIG. 6. The components that were adsorbed or absorbed in the first part of the column are then quickly flushed through conduits 184 and 32 to measuring cell 34.

Figure 8:
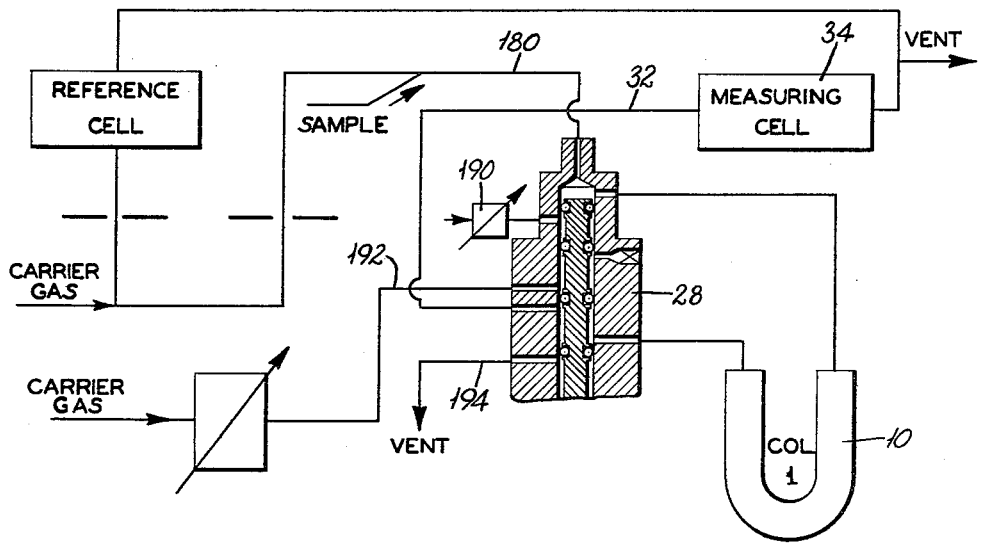
FIGS. 8 and 9 are schematic views of a modified column selector assembly for fast flushing a fractionating column.
Figure 9:
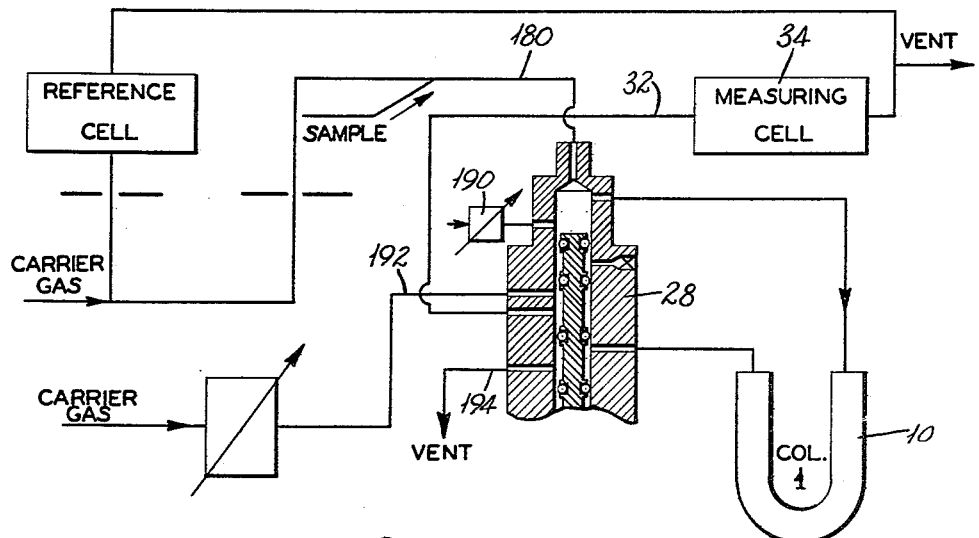

FIGS. 8 and 9 illustrate an assembly for fast flushing a column. This is done in order to elute, more quickly than normal, components which are not to be measured. In FIG. 8 the sample and carrier gas enter the top of column selector 28 from conduit 180 and flow through column 10, selector 28, and conduit 32 to measuring cell 34. A high flow carrier gas supply conduit 190 is provided but both it and carrier gas conduit 192 are dead-ended.

After the components that are to be measured are eluted, the selector is actuated to assume the position of FIG. 9 and high flow carrier gas from conduit 190 mixes with the carrier gas from conduit 180 and flows through column 10 where the components not to be measured are eluted more quickly since the increased flow of carrier gas flushes the column clean of all the residue sample. The flow continues through column selector 28 and vent conduit 194. A separate side stream of carrier gas, equal in flow to that from conduit 180, passes from conduit 192, through the column selector, and through conduit 32 to measuring cell 34. This side stream minimizes the thermal effects to measuring cell 34.

What is claimed is:

1. Apparatus for chromatographic analysis of a multi-component vapor sample which comprises column means containing material for separating components from said multi-component vapor sample; conduit means for introducing sample vapor and carrier gas into said column means; column vent means; measuring cell means; conduit means communicating between the outlet of said column means and each of said column vent means and measuring cell means, said conduit means containing selector means for alternatively directing flow from said outlet of said column means to said measuring cell means and said column vent means; and conduit means for passing a stream of carrier gas to reference measuring cell means for measuring a property of said gas to provide a basis for comparison with the measurement obtained from a binary mixture of a component of said multi-component vapor sample and said carrier gas passed through said measuring cell means to determine the concentration of a specific component of said multi-component vapor sample in the binary mixture.

2. Apparatus for chromatographic analysis of a multi-component vapor sample which comprises column means containing material for separating components from said multi-component vapor sample; conduit means for introducing sample vapor and carrier gas into said column means; column vent means; carrier gas supply means; measuring cell means; conduit means communicating between the outlet of said column means and said column vent means, carrier gas supply means, and measuring cell means, said conduit means containing selector means for alternatively directing, at predetermined intervals, flow from said outlet of said column means to said measuring cell means and said column vent means, and for periodically directing flow from said carrier gas supply means to said measuring cell means; and conduit means for passing a stream of carrier gas to reference measuring cell means for measuring a property of said gas to provide a basis for comparison with the measurement obtained from a binary mixture of a component of said multi-component vapor sample and said carrier gas passed through said measuring cell means to determine the concentration of a specific component of said multi-component vapor sample in the binary mixture.

3. Apparatus for chromatographic analysis of a multi-component vapor sample which comprises column means containing material for separating components from said multi-component vapor sample; sample supply conduit means for introducing sample vapor and carrier gas into said column means; high flow gas supply conduit means; column vent means; conduit means communicating between said sample supply conduit means, high flow gas supply conduit means, and column vent means, said conduit means containing selector means for alternatively directing, at predetermined intervals, flow from said sample means through said column means to a measuring cell means and flow from said high flow gas supply conduit means through said column means to said column vent means; and conduit means for passing a stream of carrier gas to reference cell means for measuring a property of said gas to provide a basis for comparison with the measurement obtained from a binary mixture of a component of said multi-component vapor sample and said carrier gas passed through said measuring cell means to determine the concentration of a specific component of said multi-component vapor sample in the binary mixture.

4. Apparatus for chromatographic analysis of a multi-component vapor sample which comprises column means containing material for separating components from said multi-component vapor sample; sample supply conduit means for introducing sample vapor and carrier gas into said column means; carrier gas supply conduit means; conduit means communicating between said sample supply conduit means, carrier gas supply conduit means, high flow gas supply conduit means, and column vent means, said conduit means containing selector means for alternatively directing, at predetermined intervals, flow from said sample means through said column means to a measuring cell means and flow from said high flow gas supply conduit means through said column means to said column vent means while simultaneously directing flow from said carrier gas supply means to a measuring cell means; and conduit means for passing a stream of carrier gas to reference cell means for measuring a property of said gas to provide a basis for comparison with the measurement obtained from a binary mixture of a component of said multi-component vapor sample and said carrier gas passed through said measuring cell means to determine the concentration of a specific component of said multi-component vapor sample in the binary mixture.

5. The method for chromatographic analysis of a multi-component vapor sample which comprises passing said vapor sample together with a carrier gas stream through at least one of a plurality of separation zones containing material capable of separating specific components from said vapor sample, bypassing the remainder of said plurality of separation zones with said sample vapor, passing said bypassed sample vapor through at least one flow resistance means whereby the pressure drop of said bypassed vapor through said resistance is substantially equal to the pressure drop of said vapor through said bypassed column, removing said components from each of said separation zones by elution therefrom in a carrier gas stream as binary mixtures of said carrier gas and successive specific components, and successively measuring said binary mixture eluted from said separating zones to determine the concentrations of the specific components of said multi-component vapor sample.

6. The method for chromatographic analysis of a multi-component vapor sample which comprises passing said vapor sample together with a carrier gas stream through a separation zone containing material capable of separating specific components from said vapor sample, removing said specific components from said separation zone by elution with a carrier gas stream as binary mixtures of said carrier gas stream and successive specific components, passing the desired so-formed binary mixtures to a measuring cell, venting the remaining binary mixtures whereby thermal unbalance of said measuring cell due to said remaining binary mixtures is substantially avoided.

7. Apparatus for chromatographic analysis of a multi-component fluid stream comprising, in combination, column means containing material for separating components from said multi-component fluid stream; carrier gas supply means; column vent means; measuring cell means; first conduit means for introducing the fluid stream and a first stream from said carrier gas supply means into said column means; second conduit means communicating between an outlet of said column means, said column vent means, said carrier gas supply means and said measuring cell means, said second conduit means containing selector means for directing flow from the outlet of said column means to said measuring cell means and, alternatively, directing flow from the outlet of said column means to said column vent means; and third conduit means for passing a second stream from said carrier gas supply means to a reference cell means for measuring a property of said carrier gas to provide a basis for comparison with measurements obtained from binary mixtures of discrete components of the multi-component fluid stream and the first stream from said carrier gas supply means directed to said measuring cell means whereby respective concentrations of specific discrete components of said multi-component fluid stream are determined.

8. Apparatus for chromatographic analysis of a multi-component fluid stream comprising, in combination, column means containing material for separating components from said multi-component fluid stream; carrier gas supply means; column vent means; measuring cell means; first conduit means for introducing the fluid stream and a first stream from said carrier gas supply means into said column means; second conduit means communicating between an outlet of said column means, said column vent means, said carrier gas supply means and said measuring cell means, said second conduit means containing selector means for directing flow from the outlet of said column means to said measuring cell means and, alternatively, directing flow from the outlet of said column means to said column vent means while simultaneously directing a second stream from said carrier gas supply means to said measuring cell means; and third conduit means for passing a third stream from said carrier gas supply means to a reference cell means for measuring a property of said carrier gas to provide a basis for comparison with measurements obtained from binary mixtures of discrete components of the multi-component fluid stream and the first stream from said carrier gas supply means directed to said measuring cell means whereby respective concentrations of specific discrete components of said multi-component fluid stream are determined.

9. Apparatus for chromatographic analysis of a multi-component fluid stream comprising, in combination, column means containing material for separating components from said multi-component fluid stream; carrier gas supply means; column vent means; a high-flow gas supply means; measuring cell means; reference cell means; first conduit means communicating between said multi-component fluid stream, said column means, said carrier gas supply means, said column vent means, said high-flow gas supply means and said measuring cell means, said first conduit means containing selector means for directing flow from said multi-component fluid stream combined with first flow from the carrier gas supply means through said column means to said measuring cell means and, alternatively, directing combined first flow from the carrier gas supply means and flow from the high-flow gas supply means through said column means to said column vent means; and second conduit means for passing second flow from said carrier gas supply means to said reference cell means for measuring a property of said carrier gas to provide a basis for comparison with measurements obtained from binary mixtures of discrete components of the multi-component fluid stream and the first flow from said carrier gas supply means directed to said measuring cell means whereby respective concentrations of specific discrete components of said multi-component fluid stream are determined.

10. Apparatus for chromatographic analysis of a multi-component fluid stream comprising, in combination, column means containing material for separating components from said multi-component fluid stream; carrier gas supply means; column vent means; a high-flow gas supply means; measuring cell means; reference cell means; first conduit means communicating between said multi-component fluid stream, said column means, said carrier gas supply means, said column vent means, said high-flow gas supply means and said measuring cell means, said first conduit means containing selector means for directing flow from said multi-component fluid stream combined with first flow from the carrier gas supply means through said column means to said measuring cell means and, alternatively, directing combined first flow from the carrier gas supply means and flow from the high-flow gas supply means through said column means to said column vent means while simultaneously directing second flow from the carrier gas supply means to said measuring cell means; and second conduit means for passing third flow from said carrier gas supply means to said reference cell means for measuring a property of said carrier gas to provide a basis for comparison with measurements obtained from binary mixtures of discrete components of the multi-component fluid stream and the first flow from said carrier gas supply means directed to said measuring cell means whereby respective concentrations of specific discrete components of said multi-component fluid stream are determined.

References Cited in the file of this patent

UNITED STATES PATENTS

| | | |
|---|---|---|
| 2,833,151 | Harvey | May 6, 1938 |
| 2,846,121 | Ronnebeck | Aug. 5, 1958 |
| 2,868,011 | Coggeshall | Jan. 13, 1959 |
| 2,981,092 | Marks | Apr. 25, 1961 |

OTHER REFERENCES

Publication: Analytical Chemistry, vol. 28, pages 1376–1379, September 1956, "Gas Partition of Light Engs. in Gasolines," by Lichtenfels et al. (Copy in 73—23c.)

Publication: Analytical Chemistry, vol. 30, January 1958, pages 32–35. Article by Simmons et al.

Notice of Adverse Decision in Interference

In Interference No. 95,682 involving Patent No. 3,068,686, R. G. Harmon, VAPOR FRACTION ANALYSIS, final judgment adverse to the patentee was rendered Jan. 30, 1969, as to claims 1, 2, 7 and 8.

[*Official Gazette August 5, 1969.*]